(12) United States Patent
Zehe et al.

(10) Patent No.: US 6,585,941 B2
(45) Date of Patent: *Jul. 1, 2003

(54) APPARATUS AND PROCESS FOR FILLING AND EMPTYING A VESSEL CHARGED WITH FLAMMABLE AND AGGRESSIVE GAS

(75) Inventors: Lothar Zehe, Rheinfelden (DE); Mieczyslaw Kuzma, Rheinfelden (DE); Hartwig Rauleder, Rheinfelden (DE)

(73) Assignee: Degussa AG, Duesseldorf (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,724

(22) Filed: Aug. 13, 1999

(65) Prior Publication Data
US 2001/0048908 A1 Dec. 6, 2001

(30) Foreign Application Priority Data
Oct. 16, 1998 (DE) .......... 198 47 786

(51) Int. Cl.⁷ ............ B01J 8/08; B01J 3/00; C10B 35/00; B66C 17/08
(52) U.S. Cl. .......... 422/242; 433/232; 433/233; 433/236; 202/262; 414/212; 414/220
(58) Field of Search ............ 422/236, 232, 422/233, 242; 202/262; 414/221, 220; 137/209, 275; 222/450; 141/67

(56) References Cited

U.S. PATENT DOCUMENTS

| | | | |
|---|---|---|---|
| 4,070,161 A | * 1/1978 | Harter | 48/210 |
| 4,089,429 A | * 5/1978 | Stock et al. | 48/86 R |
| 4,292,434 A | 9/1981 | Lindner et al. | |
| 4,417,069 A | 11/1983 | Brown, Jr. | |
| 4,424,198 A | 1/1984 | Ito et al. | |
| 4,649,208 A | 3/1987 | Zenbayashi et al. | |
| 4,955,989 A | 9/1990 | Mink | |
| 5,066,186 A | * 11/1991 | Shimada et al. | 414/221 |
| 6,326,506 B1 | 12/2001 | Tachikawa et al. | |
| 2001/0048908 A1 | * 12/2001 | Zehe et al. | 422/242 |

FOREIGN PATENT DOCUMENTS

| | | |
|---|---|---|
| EP | 0 263 673 A2 | 4/1988 |
| EP | 0 596 646 A1 | 5/1994 |
| EP | 1 085 022 A1 | 3/2001 |
| FR | 1 175 454 | 3/1959 |
| JP | 11029584 | 2/1999 |
| WO | WO 01/85738 A1 | 11/2001 |

* cited by examiner

*Primary Examiner*—Glenn Caldarola
*Assistant Examiner*—Douglas W Rudnick
(74) *Attorney, Agent, or Firm*—Oblon, Spivak, McClelland, Maier & Neustadt, P.C.

(57) ABSTRACT

An apparatus safely fills and empties a pressurized vessel charged with flammable and/or reactive gas. The apparatus features an upper flap combination, an intermediate lock vessel having a flushing apparatus, and a lower flap combination. The present invention also relates to a pressurized reactor which is charged with flammable and/or reactive gas and is equipped with a filling lock apparatus and an emptying lock apparatus for the simultaneous preparation of tetrachlorosilane, trichlorosilane and hydrogen. In addition, the present invention relates to a special process for filling and emptying such a reactor.

1 Claim, 2 Drawing Sheets

APPARATUS AND PROCESS FOR FILLING AND EMPTYING A VESSEL CHARGED WITH FLAMMABLE AND AGGRESSIVE GAS

BACKGROUND OF THE INVENTION

1. Field of the Invention

The present invention relates to an apparatus for the safe filling or emptying of a pressurized vessel charged with flammable and/or reactive gas. The present invention also relates to a pressurized reactor which is charged with flammable and/or reactive gas and is equipped with a filling lock apparatus and a corresponding de-ashing lock apparatus. In addition, the present invention relates to a special process for filling and emptying such a reactor. The present invention also relates to the use of such a reactor for the simultaneous preparation of tetrachlorosilane, trichlorosilane and hydrogen by reacting silicon with hydrogen chloride.

2. Description of the Related Art

It is known that, by reacting silicon and hydrogen chloride in an exothermic reaction, tetrachlorosilane and trichlorosilane can be prepared with the simultaneous formation of hydrogen and a production of residue in the form of ash. The reaction generally takes place at a pressure up to 3 bar absolute and a temperature of 400 to 1200° C. Owing to legislative requirements, it is necessary to ensure that, in such syntheses, no reactive, flammable or toxic substances escape from the plant.

For systems having hot, flammable or reactive contents into which or out of which solids are predominantly continuously filled or withdrawn, there is no shut-off device which remains permanently sealed and reliable. Owing to deposits on sealing surfaces, as well as to mechanical or thermal stress of soft packings, the tightness of a shut-off valve can continue to be impaired.

BRIEF SUMMARY OF THE INVENTION

The primary object underlying the present invention is to make the above-mentioned plants able to be operated as safely as possible.

This object is achieved according to the invention in which an apparatus for filling or emptying a pressurized vessel is charged with flammable and/or reactive gas. The apparatus features an upper flap combination, an intermediate lock vessel having a flushing apparatus, and a lower flap combination. An above average reliable mode of operation can be ensured for reactors which are operated at atmospheric pressure or under high pressure and are charged with flammable and/or reactive gas, in particular for those reactors for the simultaneous preparation of tetrachlorosilane, trichlorosilane and hydrogen.

DETAILED DESCRIPTION OF THE PREFERRED EMBODIMENTS

Figure 1:
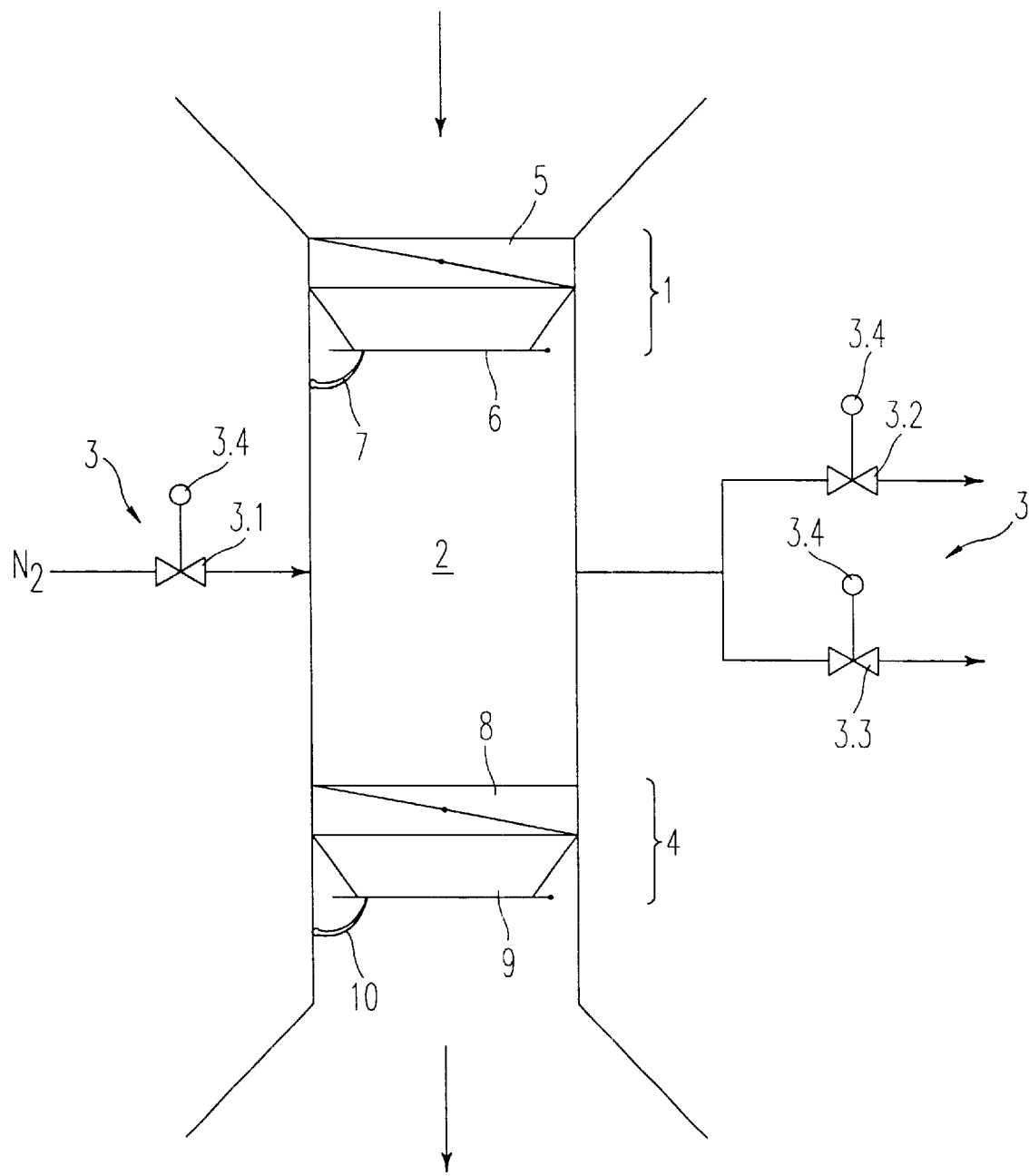
FIG. 1 shows a preferred embodiment of the apparatus according to the invention for filling or emptying a pressurized vessel charged with flammable and/or reactive gas.

The present invention relates to an apparatus for filling and emptying a pressurized vessel charged with flammable and/or reactive gas. As shown in FIG. 1, the apparatus features an upper flap combination 1, an intermediate lock vessel 2 having a flushing apparatus 3, and a lower flap combination 4. Preferably, the flap combination 1 or 4 in each case includes a first flap 5 or 8, a second flap 6 or 9, and a latch 7 or 10 for the second flap 6 or 9, respectively. In a suitable manner, the first flaps 5 and 8 are sealed by metallic seals.

The invention has the flushing apparatus 3 operated using preferably an inert gas, such as argon or particularly nitrogen. The flushing apparatus 3 comprises, in particular, a closeable infeed valve 3.1 for a flushing medium, a closeable outlet 3.2 for used oxygen-containing flushing medium, and a closeable outlet 3.3 for used flammable- and/or reactive-gas-laden flushing medium. The flushing apparatus 3 also includes respective pressure and volumetric flow measuring devices 3.4.

According to the invention, such an apparatus is used advantageously as a lock system for the safe filling and emptying of a pressurized reactor charged with flammable and/or reactive gas.

The present invention also relates to a reactor having a filling lock apparatus and a de-ashing lock apparatus. For example, in a fixed-bed reactor according to the invention which is operated in a suitable manner at a slight overpressure up to 4 bar absolute, preferably at 1.1 to 3 bar absolute, a solid, for example, lump-form or pulverulent silicon, can be reacted with a flammable and/or reactive gas, for example, hydrogen chloride, to form a product mixture which is predominantly volatile under reaction conditions and, if appropriate, comprises further gaseous and flammable or reactive compounds. Simultaneously, a particularly safe mode of operation can be ensured.

Figure 2:
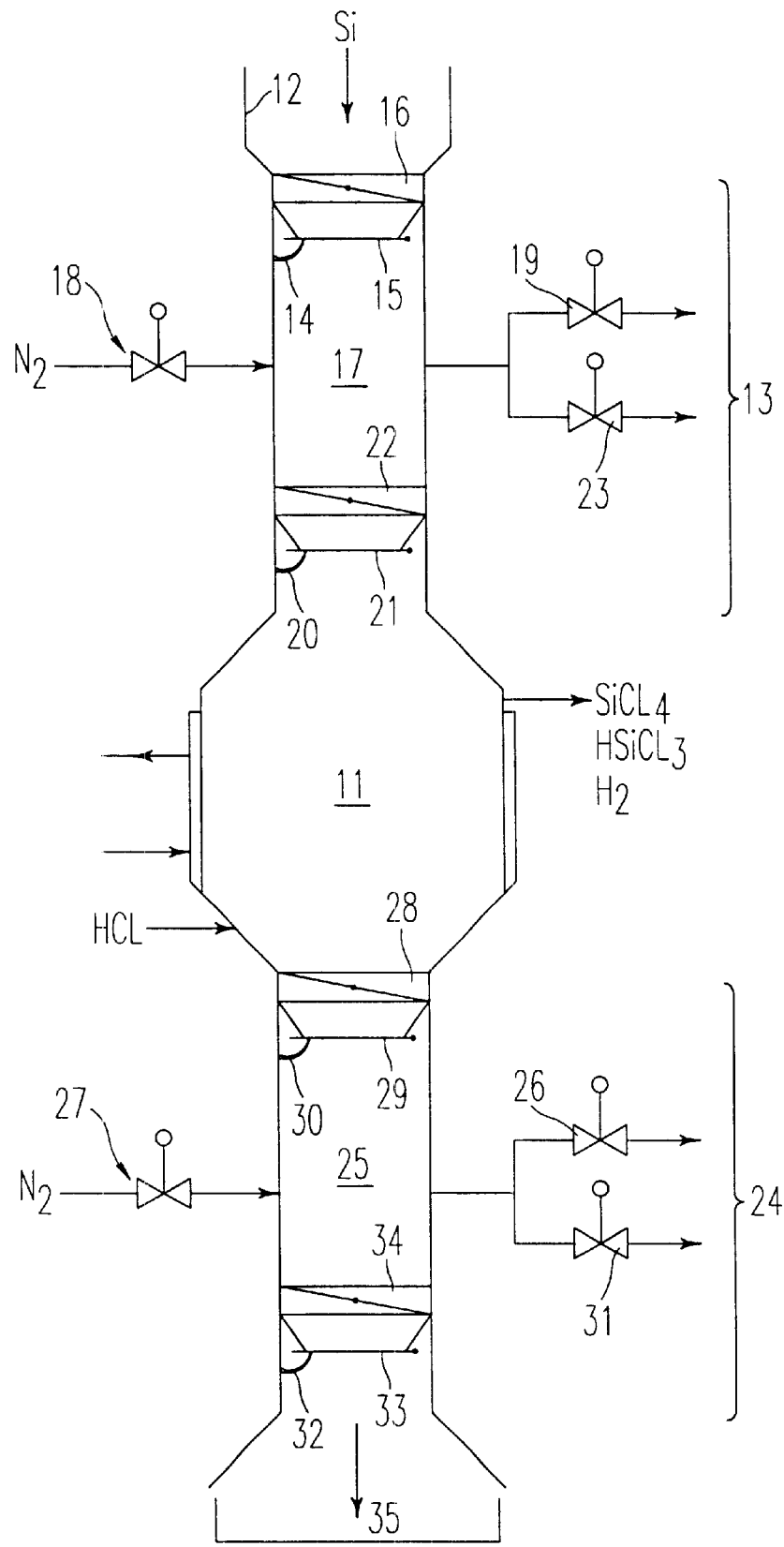
FIG. 2 shows a preferred embodiment of a reactor equipped with lock apparatuses according to the invention.

Preferably, a reactor according to the invention is used, as seen in FIG. 2, for the simultaneous preparation of tetrachlorosilane, trichlorosilane and hydrogen. Generally, in this case, downstream of the reactor, a volatile product mixture is produced and predominantly comprises tetrachlorosilane with minor constituents being trichlorosilane and hydrogen. If appropriate, traces of dichlorosilane and HCl which are condensed with high-grade hydrogen are separated off. The condensate is generally worked up by distillation.

The present invention further relates to a process for filling and emptying a pressurized reactor which is charged with flammable and/or reactive gas via lock apparatuses.

To load a reactor 11 in FIG. 2, the operator fills a preliminary vessel 12 of a filling lock apparatus 13 with a solid starting material such as silicon and detaches a latch 14 of a second flap 15 of the upper flap combination. The operator opens the second flap 15 and then opens a first flap 16 so that the solid starting material falls into a top lock vessel 17. Subsequently, the operator closes the second flap 15, the latch 14 and the first flap 16. The top lock vessel 17 is flushed with an oxygen-free flushing medium, preferably nitrogen, by opening a flushing medium infeed valve 18 and then opening an outlet 19 for used oxygen-containing flushing medium. After flushing, the operator closes the outlet 19 and then the infeed valve 18 and tests the tightness of the actuated valves by monitoring the pressure in the top lock vessel 17.

After detaching a latch 20 of a second flap 21 on the lower flap combination of the filling lock apparatus 13, the operator opens the second flap 21 and then opens a first flap 22 so that the solid material falls therethrough for loading into the reactor 11. He then closes the second flap 21 and the first flap 22 by latching them shut. Subsequently, the top lock vessel 17 is depressurized via an outlet 23 for flammable and/or reactive gas. Thereafter, the tightness of the actuated valves is tested by monitoring the pressure in the top lock vessel 17, in particular by checking whether pressure changes are observed.

For emptying the reactor 11, for example down an ash take-off chute 35 in FIG. 2, the operator de-ashes an emptying lock apparatus 24 and depressurizes a bottom lock vessel 25 via an outlet 26 for an oxygen-containing flushing medium after flushing the vessel 25 via infeed valve 27, preferably with nitrogen. This flushing is accomplished after closing a first flap 28 and a second flap 29, including a latch 30 of an upper flap combination of the emptying lock apparatus 24. After closing the flaps 28 and 29, the ash-charged and product-gas-charged bottom lock vessel 25 is cleared by opening the flushing medium infeed valve 27 and an outlet 31, then closing the outlet 31 and the infeed valve 27. The tightness of the actuated valves is tested by monitoring the pressure in the bottom lock vessel 25.

After detaching a latch 32 for a second flap 33 of a lower flap combination of the emptying lock apparatus 24, the operator opens the second flap 33 and then a first flap 34 for emptying the remaining solid material out of the bottom lock vessel 25. The operator then closes the second flap 33 and the first flap 34 of the lower flap combination of the emptying lock apparatus 24, latching them and again testing for tightness, in particular by checking whether any pressure changes are observed in the bottom lock vessel 25.

In the process according to the invention, the lock apparatuses 13 and 24 are preferably flushed each time after actuating the infeed valves 18 and 27 and are subsequently tested for tightness. In the event of impermissible pressure changes, the filling and emptying steps are stopped. Then, generally, in order to be able to further assure the tightness and safe operation of the plant, the actuated leaking valves and seals must be replaced.

Preferably, in the process according to the invention, silicon and hydrogen chloride are reacted to form chlorosilanes and hydrogen, in particular hydrogen having a purity of 98 to 100% so that gas of constant quality is produced. The process according to the invention is advantageously and preferably operated continuously.

Numerous modifications and variations of the present invention are possible in light of the above teachings. Thus, it is understood that, within the scope of the appended claims, the invention may be practiced otherwise than as specifically described herein.

What is claimed as new and desired to be secured by Letters Patent of the United States is:

1. A device comprising:
   an upper filling lock apparatus; and
   a lower de-ashing lock apparatus;
   wherein these two apparatuses each include an upper flap combination arranged in a top part thereof;
   a flushing medium infeed valve arranged in a middle part of one vertical side thererof;
   a first closeable outlet for used oxygen-containing flushing medium arranged in a middle part of an opposite vertical side thereof;
   a second closeable outlet for flammable and/or reactive gas also arranged in the middle part of the opposite vertical side thereof;
   respective pressure and volumetric flow measuring devices for the infeed valve, the first closeable outlet, and the second closeable outlet;
   an intermediate reactor having a flushing apparatus arranged in a middle part of a vertical side thereof, said reactor being a fixed bed for simultaneous preparation of tetrachlorosilane, trichlorosilane and hydrogen; and
   a lower flap combination arranged in a bottom part thereof.

* * * * *